Patented Feb. 5, 1952

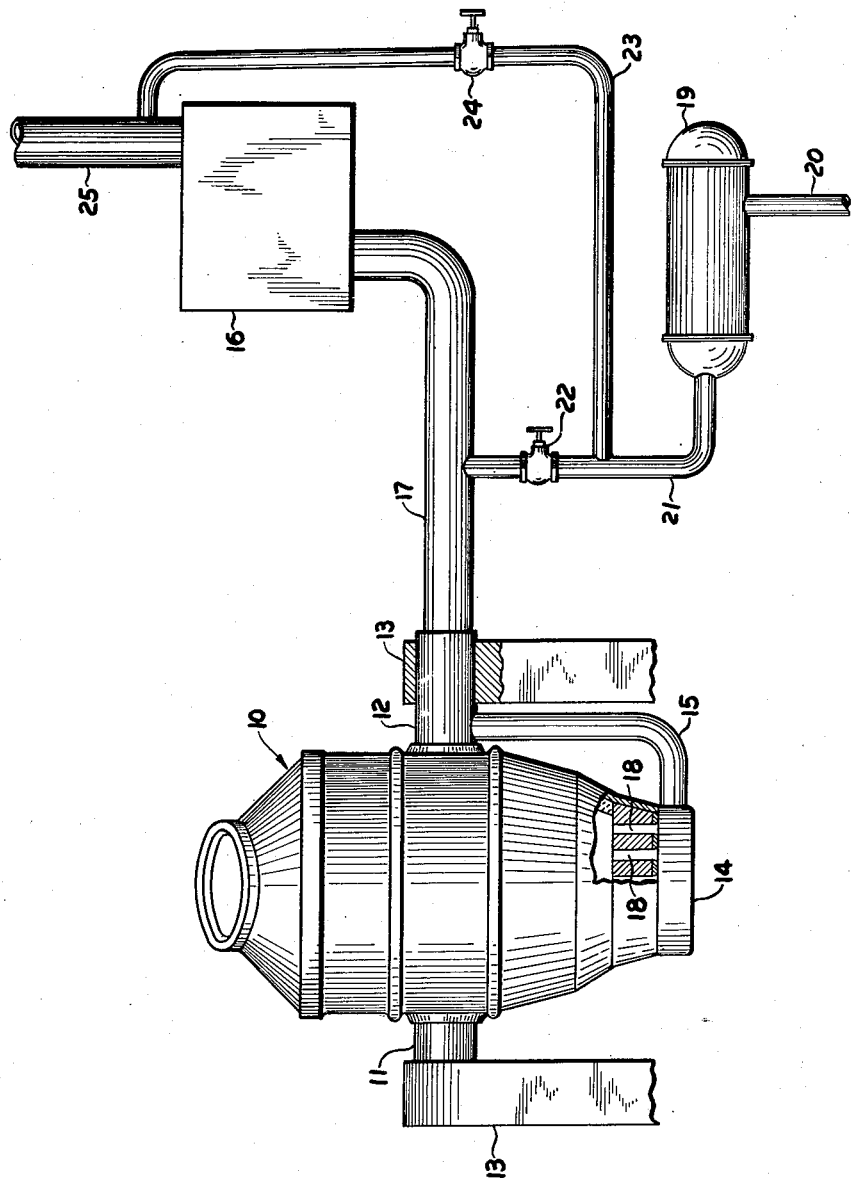

2,584,151

UNITED STATES PATENT OFFICE 2,584,151

METHOD OF BLOWING FERROUS METAL

Floyd L. Morrison, Weirton, W. Va., assignor to National Steel Corporation, a corporation of Delaware Application November 12, 1947, Serial No. 785,219

5 Claims. (Cl. 75—60)

This invention relates to improvements in blowing ferrous metal and more particularly relates to improvements in blowing ferrous metal in a converter.

In those plants using the "Bessemer" process or modifications of this process to produce all or part of their steel, molten pig iron from the blast furnace is charged into the acid-type converter with or without scrap ferrous metal and the charge then blown with an air blast. The blowing operation reduces the silicon, manganese and carbon content of the metal through oxidation reactions. During the first portion of the blowing period the silicon and manganese are rapidly oxidized and a relatively small amount of the carbon is eliminated. The last portion of the blowing operation primarily reduces the carbon content of the charge. Air contains a relatively large amount of inert nitrogen which increases the blowing period by decreasing the rates of the reactions and by conducting away a large amount of heat.

In the past it has been proposed that an oxygen rich gas, such as pure or substantially pure oxygen or air enriched with oxygen, be used as the oxygen containing gas in place of air. Although such proposals have been repeatedly made, oxygen rich blasts have not been used to any great extent. One reason why oxygen has not been used extensively is that its use has caused unexpected difficulties. The use of an oxygen rich blast makes it much more difficult for the operator to control accurately and properly the blowing operation. Further, increasing the oxygen content tends rapidly to oxidize the carbon without oxidizing the silicon so that the blown metal contains a large amount of residual silicon. Normally, it is essential that the metalloid silicon in metal be reduced to as low a value as possible and this is especially true when the blown metal is charged into the open hearth furnace as is done in the Weirton process described in Patent No. 2,390,346. When the charge contains, for example, chromium and it is desirable to have this metalloid in the blown metal, then an oxygen rich blast can be used to effect oxidation of the carbon without eliminating the chromium. It has been proposed, for example, that steam should be added to an oxygen rich gas to reduce or control the rise in temperature and prevent oxidation of the carbon without material oxidation of the silicon, but this nullifies, at least in part, the advantages hoped for in using such a blast. The production of oxygen or oxygen rich gas that can be used to enrich the air blast is expensive and the advantages, such as an increase in the scrap charged and a shorter blowing period, resulting from the use of oxygen must be sufficient to counterbalance the added cost. For these and other reasons, oxygen rich blasts have not been widely used. Some authorities have gone so far as to question whether the use of an oxygen rich blast in a converter is of any value for the benefits are out-weighed by the difficulties encountered.

Accordingly, an object of the present invention is to provide an improved method of operating a converter.

It is also an object of the present invention to operate a converter in such a manner as to obtain an increase in the amount of scrap relative to the amount of molten pig iron that can be charged to the converter and to obtain a reduction in the blowing period.

Another object of the present invention is to obtain the advantages of using an oxygen rich blast in the converter without the disadvantages normally associated with such a blast.

A further object of the present invention is to provide a novel method of using an oxygen rich blast in the converter that is easily and properly controlled.

It has been discovered that an oxygen rich blast has different effects and produces different results during the various portions of the blowing operation. During the first portion or "meltdown" period of the blowing operation, an oxygen rich blast increases the amount of scrap which can be charged and reduces the blowing period. The use of an oxygen rich blast while the scrap is being melted rapidly reduces the silicon content of the metal to a lower value without increasing the rate at which carbon is eliminated provided, that as soon as the solid scrap is melted the blast is changed to air or to a gas containing the same percentage of oxygen. When the enrichment of the blast is stopped as soon as the scrap is melted, the operator can more readily control the operation as additional oxygen in the blast so changes the characteristics of the flame that the operator cannot accurately control the operation. All, or substantially all, of the increase in the scrap charge and the reduction of the blowing time, as well as the reduction in the amount of silicon in the blown metal that can be effected by using an oxygen enriched blast for the entire blowing period can be obtained by using an oxygen rich blast only while the scrap is being melted. There are advantages obtained when an oxygen rich blast is used during this period, whereas, when such a blast is used during the period immediately following the melt-down of the scrap, disadvantages result.

As described more fully in my copending application Serial No. 785,218, now abandoned, filed the same day as this application, increasing the oxygen content of the blast during the relatively short finishing period of the blowing operation improves separation of the slag from the molten iron. Accordingly, I also contemplate using an oxygen rich blast until the scrap is melted and then using a blast containing about the same percentage of oxygen as air. The blast used during the finishing period may be air, or contain about the same amount of oxygen as air, or be air enriched with added oxygen. In order to obtain a reduction in the blowing period, an increase in the amount of scrap charged, and less silicon in the blown metal, the blast is enriched with oxygen during all or part of the melt-down period. To obtain an increase in the cleanliness of the blown metal and produce blown metal relatively free of slag the blast is enriched with oxygen during the finishing period which is not more than about 1½ to 2 minutes at the end of the blow immediately preceding discharge of the blown metal from the converter. With either procedure the advantages of an oxygen rich blast are obtained without the customary disadvantages at less cost as oxygen is not used during the entire blowing period. Enriching the blast during the intermediate period between the melt-down and clean-up periods has no appreciable advantage such as decreasing the length of the blowing period, increasing the amount of scrap which can be charged or improving separation of the slag from the metal in the converter. An oxygen rich blast during the intermediate period makes control of the operation quite difficult, tends to cause oxidation of the carbon without eliminating the undesirable metalloids in the charge and tends to cause excessive oxidation and loss of iron.

It is having the percentage oxygen content of the blast during the first portion of the blowing period above the percentage of oxygen in air that effects the increased reduction in silicon in the blown metal, reduces the blowing period and increases the amount of scrap which may be charged along with the blast furnace iron into the converter. The length of this initial period may be less than, but not more than, the length of time required to melt the solid ferrous metal scrap. Normally, the scrap will be melted in 4½ minutes, or less. The length of the melt-down period will vary depending on a number of factors including the quantity of scrap charged to the converter. Economic factors at the present time tend to limit the percentage oxygen content to not more than about 35% by weight, but higher percentages may be used. Preferably, sufficient oxygen is added to the normal air blast so that the enriched blast contains about 25% to 35% by weight of total oxygen. Steam or water vapor may be added to the blast when it is enriched with oxygen, if desirable.

These and other objects and advantages will become more apparent when considering the following description taken in connection with the accompanying drawing in which there is a diagrammatically shown apparatus including an acid-type converter constructed and arranged for carrying out the present invention.

Referring to the drawing, an acid-type, refractory lined converter 10 is pivotally or tiltably mounted on a pair of trunnions 11 and 12 rotatably supported in a pair of supports 13. At the bottom of the converter there is a wind box 14 which is in communication with the outlet end of a pipe 15. The outlet side of a blower 16 is connected through pipe 17, hollow trunnion 12 and pipe 15 to the wind box 14. A plurality of tuyères 18 are in communication with wind box 14 so that when the blower 16 is in operation, a blast of oxygen containing gas is blown through the tuyères 18 and the molten metal in the converter 10.

Means are provided for increasing the oxygen content of the blast. A tank 19 which may be a relatively large storage tank or which may be connected through a pipe 20 to a source of pure or impure oxygen is connected through pipe 21 to pipe 17. Pipe 21 contains a flow control valve 22 which may be opened to admit the desired amount of oxygen to pipe 17. When oxygen is added to pipe 17, the oxygen pressure must be higher than the blast pressure on the outlet side of blower 16 so that the oxygen will flow into the pipe 17 and mix with the air blast. Preferably, the oxygen is added to the inlet side of the blower. Pipe 23 containing valve 24 is connected to oxygen pipe 21 and to an inlet pipe 25 of blower 16. Inlet pipe 25 is connected to a suitable source of blast air which may be atmospheric air. With valve 24 open, oxygen flows through pipe 23, pipe 25 and the blower 16. When the oxygen is added to the blast on the inlet side of the blower, the pressure of the oxygen can be relatively low. The oxygen may be pure oxygen or impure oxygen if it is of sufficient purity so that it can be used to enrich the air blast.

In operation, the converter 10 is turned down to substantially the horizontal position and is charged with molten blast furnace iron. As soon as the converter is charged, the blower 16 is started and the blast is turned on and simultaneously the converter is returned to the erect position. The blast of air flows up through the molten iron and scrap, if any, to oxidize the carbon, silicon, and manganese. During the first part of the blowing operation, the silicon is relatively rapidly oxidized, and only a small amount of carbon is oxidized. During the intermediate blowing step, both the silicon and carbon are oxidized in more nearly equal amounts. During the finishing or final period immediately preceding discharge of the blown metal, only a slight amount of silicon is oxidized while a relatively large amount of carbon is oxidized. The oxidized silicon and manganese along with the oxidized iron form a slag which floats on top of the molten metal. If conditions are such that the slag separates cleanly from the metal only a slight amount of slag or no slag will be left in the molten metal.

A number of blows were made in which charges of ferrous metal scrap and molten blast furnace iron were blown with a blast at a pressure of about 25 pounds per square inch and the blast volume was about 30,000 cubic feet per minute.

The blast consisted of atmospheric air containing the normal quantity of moisture present in the outside air and this blast was enriched with sufficient oxygen only during the period or periods set forth so as to contain the percentage of oxygen specified. The blast furnace iron contained about 4.0 to 4.40% carbon, from .90 to 1.30% manganese and from .90 to 1.25% silicon.

*Example 1*

In this example, the charge containing 9,000 pounds of ferrous metal scrap and 47,000 pounds of blast furnace iron was blown with an oxygen enriched blast containing about 27% oxygen for 4½ minutes and an analysis made of the steel at the end of this melt-down period. The carbon content was reduced to 3.10% and the silicon content was reduced to .018%. In a similar blow using the usual air blast, the metal at the end of 4½ minutes contained 3.15% carbon and .370% silicon. Thus, the oxygen enriched blast materially increased the amount of silicon oxidized without materially affecting the rate of oxidation of the carbon.

*Example 2*

In this blow, the charge contained 10,000 pounds of solid scrap and 45,000 pounds of molten iron and the blast was enriched with oxygen only for the first 1½ minutes. The oxygen enriched blast contained about 27% by weight of oxygen. The entire blowing period required only 7 minutes. The blown metal contained 1.88% carbon and .007% silicon.

*Example 3*

A charge consisting of 8,000 pounds of scrap and 40,000 pounds of blast furnace iron was blown with an air blast enriched with oxygen only for the first 3½ minutes of the blowing period. The enriched blast contained about 27% by weight of total oxygen. The entire blowing period was 7 minutes and the blown metal contained 1.73% carbon and .007% silicon.

*Example 4*

In this blow, the charge contained 46,000 pounds of molten metal and 10,000 pounds of solid scrap and the air blast was enriched during the first 3 minutes so that it contained about 27% by weight of oxygen. The air blast was also enriched during the final 2 minutes of the blowing period so that the blast contained about 25% by weight of oxygen. The total length of the blowing period was 6 minutes. The blown metal contained 1.91% carbon and .007% silicon. The blown metal was charged to the open hearth furnace and was relatively free of silicon inclusions in addition to having a low silicon content which is especially important when the blown metal is charged to the open hearth.

In all of the above examples, and taking into consideration the carbon content, the silicon content of the blown metal is less than it would have been if the blast had not been enriched with oxygen during the first portion of the blow. Normally, and as set forth in the Patent No. 2,390,346 of Bayer et al., the usual air blast will reduce the silicon content to from .01% to .05%. Further, the length of the blow is shorter than it would have been if the blast had not been enriched with oxygen.

*Example 5*

For purposes of illustration, two similar charges were blown. For one charge the blast was enriched to 27% oxygen only for the first 4 minutes and the blown metal contained 2.43% carbon and .007% silicon. The blast for the second charge was enriched by the same amount for the first 3½ minutes and then was enriched for ¾ minute after the scrap was melted making a total of 4¼ minutes. The blown metal from the second charge contained 2.35% carbon and .008% silicon. Thus, enriching the blast during the melt-down period is more effective in eliminating silicon than enriching the blast after the melt-down period.

It is to be understood that the present invention is not limited to this blast furnace iron, but may be used for blast furnace irons containing other, different quantities of elements. The present invention is particularly useful with blast furnace iron of this type which is used in the Weirton process described in the above mentioned Bayer et al. patent for the blown metal in this process is charged into the open hearth furnace. Silicon is undesirable in the open hearth furnace as it shortens the life of the furnace and increases the amount of the lime charge. Furthermore, the present invention is not limited to acid-type converters and may be practiced with converters of either the acid or basic type.

Increasing the oxygen content of the blast during during all or part of the melt-down period so that the blast contains a higher percentage of oxygen than air lowers the silicon content, reduces the blowing period, and tends to increase the amount of scrap which may be charged into the converter along with the molten blast furnace iron. Increasing the oxygen content of the blast during the finishing period at the end of the blow aids in effecting separation of the slag from the blown metal so that the blown metal is relatively free of slag inclusions.

I claim:

1. In the process of blowing ferrous metal in a converter, the steps comprising, charging molten blast furnace iron and solid ferrous metal into a converter, blowing the charge with an oxygen-enriched air blast for a period not longer than required to melt the solid metal, then blowing the charge with air, and finally finish blowing the charge.

2. In the process of blowing ferrous metal in a converter, the steps comprising, charging molten blast furnace iron and solid ferrous metal into a converter, blowing the charge with an oxygen-enriched air blast for a period not longer than is required to melt the solid metal, and then blowing the charge with air.

3. In the process of blowing ferrous metal in a converter, the steps comprising, charging molten blast furnace iron and solid ferrous metal into a converter, blowing the charge with a blast of oxygen-enriched air containing from 25% to 35% by weight of oxygen for a period not longer than required to melt the solid metal, then blowing the charge with air, and finish blowing the charge.

4. In the process of blowing ferrous metal in a converter, the steps comprising, charging molten blast furnace iron and solid ferrous metal into a converter, blowing the charge with a blast of oxygen-enriched air containing up to 35% by weight of oxygen for a period not longer than is required to melt the solid metal, then blowing the charge with air, and finish blowing the charge.

5. In the process of blowing ferrous metal in a converter, the steps comprising, charging molten blast furnace iron and solid ferrous metal into a converter, blowing the charge with oxygen-enriched air containing from 25% to 35% by weight of oxygen for a period not longer than is required to melt the solid metal and for a period of not more than four and a half minutes, then blowing the charge with air, and finish blowing the charge.

FLOYD L. MORRISON.

REFERENCES CITED

The following references are of record in the file of this patent:

UNITED STATES PATENTS

| Number | Name | Date |
|---|---|---|
| 1,709,389 | Davis | Apr. 16, 1929 |
| 1,976,354 | McCaffery | Oct. 9, 1934 |
| 2,390,436 | Bayer et al. | Dec. 4, 1945 |

FOREIGN PATENTS

| Number | Country | Date |
|---|---|---|
| 16,093 | Great Britain | 1908 |
| 472,397 | Great Britain | Sept. 12, 1937 |

OTHER REFERENCES

"The Making, Shaping and Treating of Steel" (2nd edition), page 187, published by Carnegie Steel Company, Pa.